F. S. SHIELDS AND J. A. CAMM.
MACHINE TOOL.
APPLICATION FILED AUG. 6, 1917.

1,312,276.

Patented Aug. 5, 1919.
2 SHEETS—SHEET 1.

F. S. SHIELDS AND J. A. CAMM.
MACHINE TOOL.
APPLICATION FILED AUG. 6, 1917.

1,312,276.

Patented Aug. 5, 1919.
2 SHEETS—SHEET 2.

UNITED STATES PATENT OFFICE.

FRANK S. SHIELDS AND JOHN A. CAMM, OF CLEVELAND, OHIO.

MACHINE-TOOL.

1,312,276.     Specification of Letters Patent.     Patented Aug. 5, 1919.

Application filed August 6, 1917. Serial No. 184,550.

*To all whom it may concern:*

Be it known that we, FRANK S. SHIELDS and JOHN A. CAMM, citizens of the United States, residing at Cleveland, in the county of Cuyahoga and State of Ohio, have invented a certain new and useful Improvement in Machine-Tools, of which the following is a full, clear, and exact description, reference being had to the accompanying drawings.

This invention relates to machine tools and especially to milling machines embodying an adjustable tailstock and a dividing head.

The invention resides in improvements in certain parts of machines of the above noted type and in the present embodiment of the invention the improvements are illustrated as applied to a tailstock which is generally adaptable for use with various types of machine tools. One object of the invention is to improve the mounting of the head and center of the tailstock which are both vertically and angularly adjustable with reference to the supporting base, the improvements particularly residing in a novel arrangement of an adjusting mechanism whereby all the parts thereof are removed from an exposed position on the tailstock and are wholly inclosed within the structure of the tailstock itself. Further objects are to reduce the number of parts of the tailsock to a minimum and to simplify their construction whereby the cost of production, manufacture, and assembly thereof is greatly reduced, the wide range of adjustments and the accuracy and security of alinement being unimpaired by the simplicity of the parts.

Figure 1:
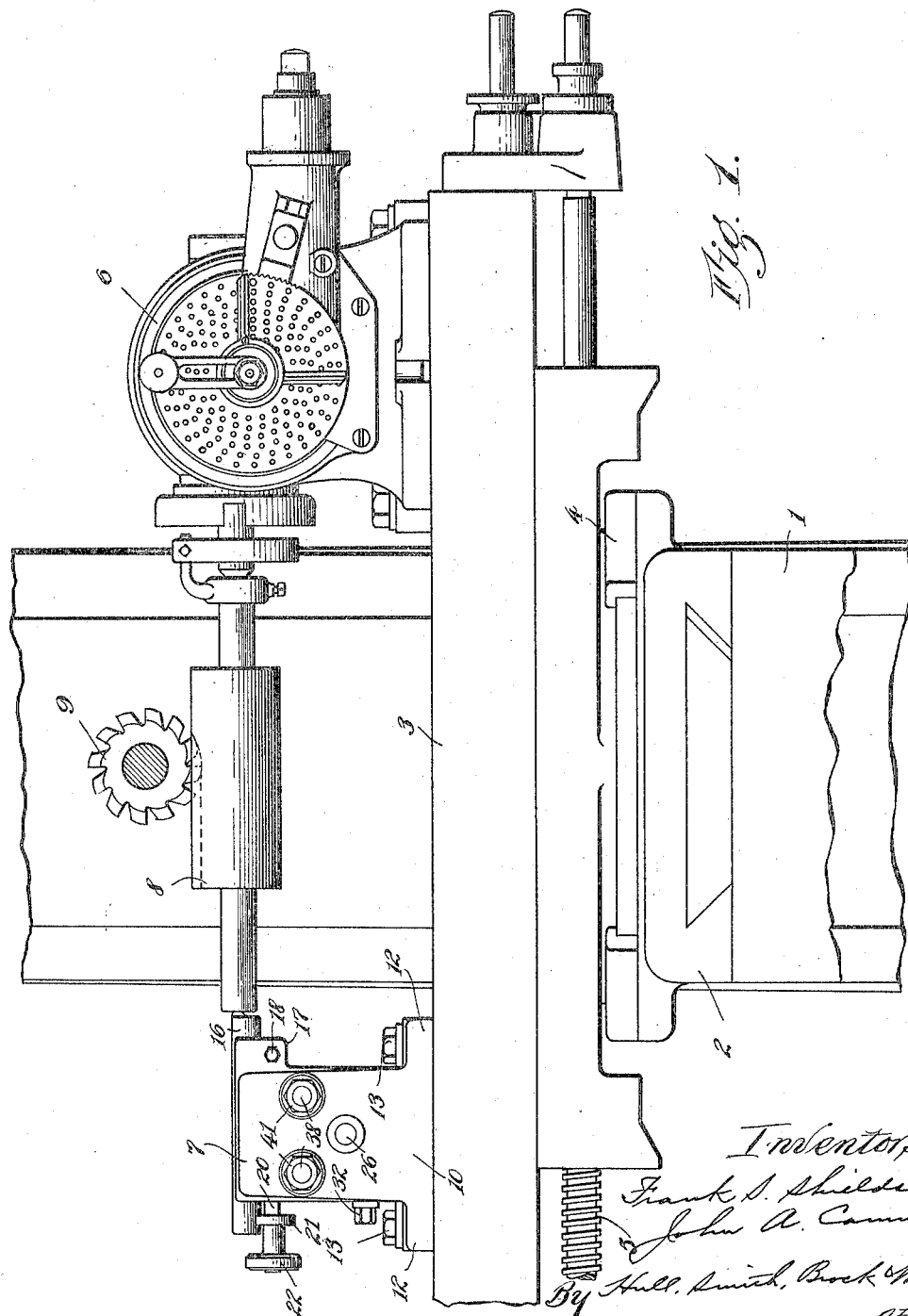
Figure 2:
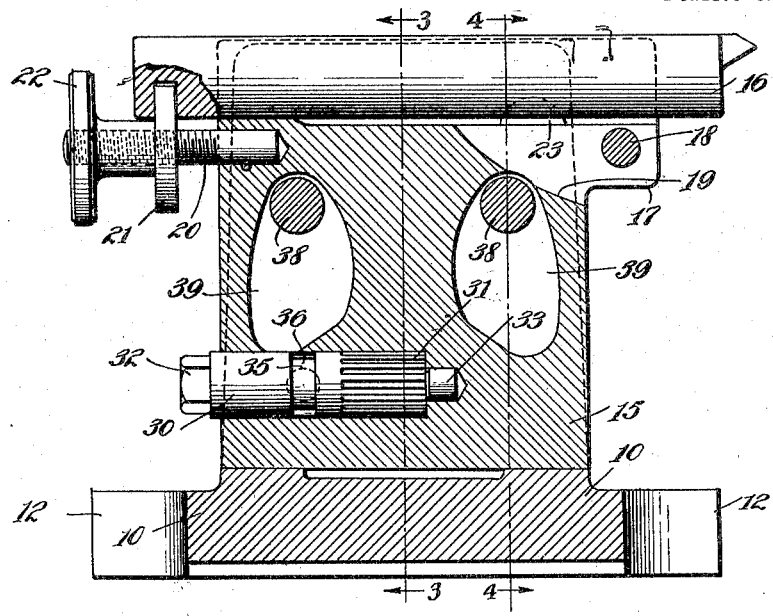
Figure 3:
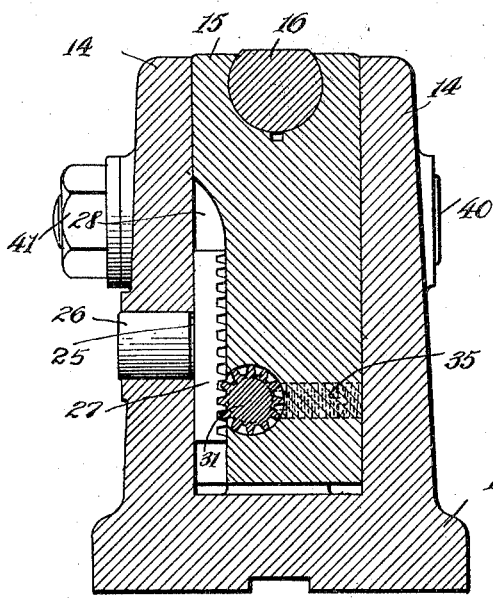
Figure 4:
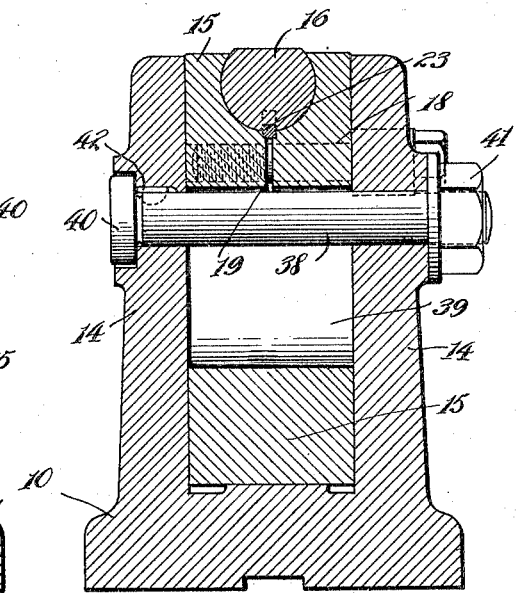

For a better understanding of the invention and the various features and advantages thereof above referred to and others which will hereinafter appear reference may be had to the drawings accompanying this application in which Figure 1 is a side view of a milling machine table with an indexing head and a tailstock mounted thereon; Fig. 2 is a central longitudinal section through the tailstock; Fig. 3 is a central sectional view at right angles to Fig. 2 on the line 3—3 thereof; and Fig. 4 is a cross sectional view on the line 4—4 of Fig. 2. Referring to the drawings where the same numerals refer to similar parts throughout, a portion of a milling machine is illustrated as having a base or knee 1, a saddle 2 dovetailed on the base 1 for adjustment thereon, and a table 3 mounted on the saddle 2 and swiveled thereon for pivotal movement in circular guides 4. The table 3 is longitudinally adjustable through the medium of a feed screw 5, the adjusting mechanism not being illustrated in this drawing. The table 3 carries on one end an indexing head 6 and longitudinally removed therefrom the table carries a tailstock 7, the tailstock 7 and the indexing head 6 coöperating together to carry and support the work 8 which is being milled by a milling tool indicated at 9.

The invention in the present application resides in the structural features of the tailstock including the arrangement of the adjusting mechanism for the head of the tailstock, and these features will now be described. The tailstock indicated generally at 7 in Fig. 1, comprises a base 10 which is provided at either end with ears or lugs 12, these lugs 12 being adapted to receive clamping bolts 13 which pass downwardly through suitable guides or openings as for instance a T-slot (not shown) in the table 3 whereby the tailstock as a whole may be securely fixed in any position longitudinally of the table 3 and in alinement therewith. The base 10 is formed, preferably integral therewith, with two upright opposed clamping jaws 14, the opening between these jaws 14 being in alinement with the work 8. The jaws are both provided with smooth and plane opposed faces and are adapted to receive therebetween in a close fitting manner a head 15, the head similarly having smooth bearing faces corresponding to the bearing faces of the jaws 14. The head 15 is provided on its top with a longitudinal circular groove and in this groove is disposed a dead center 16. On the top thereof the head 15 is provided with a forwardly extending pair of clamping jaws 17 and through these clamping jaws 17 passes a horizontally disposed clamping bolt 18. The faces of the clamping jaws 17 are in alinement with and correspond with the circular groove in the head, and the head is provided with a slot 19 extending rearwardly from the jaws 17 and in register with the space between the jaws. The jaws 17 thus serve as a chuck for clamping the center 16 in any position to which it has been adjusted. The longitudinal adjustment of the center may conveniently be accomplished by means of the devices shown comprising a stud 20 in longitudinal alinement with the center and arranged therebeneath and securely anchored in an opening on the rear of the head. The stud 20 on its free end is provided with external screw threads and carries an internally threaded sleeve thereon, this sleeve carrying on its inner end a circular disk 21 which registers with and enters a transverse slot in the underside of the rear of the dead center. This sleeve also conveniently carries on its outer end a hand wheel 22 for rotating the sleeve on the stud 20 and thereby accurately adjusting the longitudinal position of the center 16. For preventing the turning of the center in its groove during the operation of the machine or the adjustment of the parts, both the head and the center are provided with registering rectangular slots which are adapted to receive a standard key 23 which will permit a longitudinal adjustment of the center but will prevent any rotation thereof. One of the jaws 14 is provided with an opening therein and around this opening on the inside of the jaw a circular recess is provided for receiving a trunnion 25, the trunnion 25 being provided with a stud 26 passing outwardly through the opening in the jaw. The trunnion 25 carries thereon a vertically disposed rack 27, this rack 27 however being capable of assuming with the trunnion 25 various angles of inclination to the vertical. The side of the head 15 adjacent the trunnion 25 and rack 27 is provided with a slot 28 which is adapted to receive in a close fitting manner the rack 27 whereby the rack serves as a vertical guide for the head. By means of the rack and the coöperative slot the head 15 may assume various relative positions longitudinally of the rack. The head 15 is provided on its rearward end with a circular opening arranged longitudinally thereof and extending to a point beyond and forward of the rack 27, and in this circular opening or bearing is journaled a shaft 30, the shaft 30 being provided on its inner end with a spur gear or pinion 31 meshing with the rack 27 for elevating the head 15, and in the embodiment shown the gear is milled or cut in the shaft itself. The shaft 30 is provided on its outer end with a suitable wrench or other adjusting tool receiving head 32 and on its inner end with a centering pin 33 extending forwardly beyond the pinion 31 into a reduced centering recess in the head. The head 15 is also provided with an internally threaded passageway at right angles to the shaft 30, extending inwardly from the side opposite the rack 27, and this passageway is adapted to receive an externally threaded set screw 35 which is provided on its inner end with a reduced portion for entering an annular slot 36 provided around the circumference of the shaft 30, thereby securely locking the shaft 30 in its operative position. By this arrangement it is obvious that the head 15 may be vertically adjusted within limits defined by the length of the rack 27, the adjustment being accomplished by rotating the shaft 30. By means of the assembly of the rack 27 with the head, it is also clear that the head 15 and center 16 turn with the rack about the trunnion 25 and the stud 26 as a pivotal point and may be adjusted to various angles with the horizontal. The head 15 may be securely clamped in any adjusted position by means of clamping bolts 38 which pass through the jaws and transversely through the head 15, the latter being provided with transverse and irregular openings 39 to accommodate and clear the bolts in any adjustment it is desired to make in practice. The bolts 38 are provided on one end with suitable heads 40 which are received in corresponding recesses on the exterior of one of the jaws and on the other end with nuts 41, suitable washers being interposed between the nuts 41 and the clamping jaws as indicated. To prevent the turning of the bolts 38 when the nuts 41 are being tightened, the bolts may be locked in position by means of keys 42 which rest in registering slots in the clamping jaw and in the bolt.

It is thus apparent that the center may be easily and quickly adjusted to any desired position and securely clamped therein, a minimum of time and labor being consumed in the operation. The adjusting mechanism is entirely inclosed within the structure of the tailstock, the parts thereof being entirely removed from an exposed position, and all the parts are of simple construction whereby they may be easily standardized and the cost of manufacture thereof reduced to a minimum.

While we have set forth our invention in the specific manner required by the patent statutes it is understood that the claims hereto annexed are not to be construed as limited to the specific embodiment shown except as is specifically recited therein or is rendered necessary by a consideration of the prior art.

Having thus described our invention, what we claim is:—

1. In an apparatus of the type set forth, a tailstock comprising a base and two upright clamping members thereon and spaced from each other, an angularly and vertically adjustable head adapted to be clamped between said uprights, a rack carried by one of said uprights and trunnioned thereon, said head being adjustable longitudinally of said rack but fixed to said rack to turn therewith on its trunnion, and elevating means carried by said head comprising a pinion in mesh with said rack.

2. A tail stock having, in combination, a pair of clamping jaws, a head vertically and angularly adjustable therebetween, a rack pivotally mounted on one of the jaws, and a shaft carried by the head and having a pinion engaging the rack, to raise or lower the head.

3. In an apparatus of the type set forth, a tailstock comprising a base and two upright clamping members thereon, said clamping members being spaced from each other, a head angularly and vertically adjustable between said clamping members, a rack carried by one of said clamping members and trunnioned on its inner side, said head having a slot or guideway for receiving said rack, an elevating pinion carried by said head and in mesh with said rack, means for rotating said pinion to elevate the head, and means for clamping said clamping members against said head for fixing the head in any adjusted position.

4. In an apparatus of the type set forth, a tailstock comprising a base and two upright clamping members thereon, said clamping members being spaced from each other, a head angularly and vertically adjustable between said clamping members, a rack carried by one of said clamping members and trunnioned on its inner side, said head having a vertical slot or guideway for receiving said rack, an elevating shaft at right angles to said guideway carried by said head, a pinion on said shaft in mesh with said rack, means for rotating said shaft to elevate the head, and means for drawing said clamping members against said head for fixing the head in any adjusted position.

5. In apparatus of the type set forth, a tailstock comprising a base, two upright smooth faced clamping jaws on said base, a smooth faced head angularly and vertically adjustable between said jaws, clamping bolts passing through said jaws and transversely through said head for fixing and anchoring said head in the adjusted position, said head having enlarged openings to clear said bolts in any adjusted position, a rack carried by one of said jaws on its inner side, said rack being mounted on a trunnion for pivotal movement thereon, said head having an elongated vertical slot on one side thereof for accommodating said rack, a shaft carried by said head at right angles to said rack and having thereon a pinion meshing with said rack, said head having an opening at right angles to and in alinement with said shaft, and a locking bolt resting in said opening and engaging said shaft to hold the same in operative position.

6. In apparatus of the type set forth, a tailstock comprising a base, two upright smooth faced clamping jaws on said base, a smooth faced head angularly and vertically adjustable between said jaws, a vertical guide carried by one of said jaws on its inner side and mounted on a trunnion for pivotal adjustment thereon, said head having an elongated vertical slot or guideway on one side thereof for receiving said guide, means for elevating said head with reference to said base along said guideways, and means for clamping said head in any adjusted position thereof securely between said jaws.

7. In apparatus of the type set forth, a tailstock comprising a base, two upright plane faced clamping jaws on said base, a head angularly and vertically adjustable in a vertical plane between said jaws, a center mounted on said head and adjustable longitudinally thereon, a rack carried by one of said jaws on its inner side and mounted on a trunnion for pivotal movement thereon, said head having an elongated vertical slot or guideway on one side thereof for receiving said rack, elevating means carried by said head and comprising a pinion meshing with said rack, and clamping bolts passing through said jaws and said head for fixing said head in any adjusted position.

In testimony whereof, we hereunto affix our signatures.

FRANK S. SHIELDS.
JOHN A. CAMM.

Copies of this patent may be obtained for five cents each, by addressing the "Commissioner of Patents, Washington, D. C."